Feb. 26, 1957 H. C. CARLSON 2,782,882
BRAKE BEAM
Filed Nov. 26, 1951
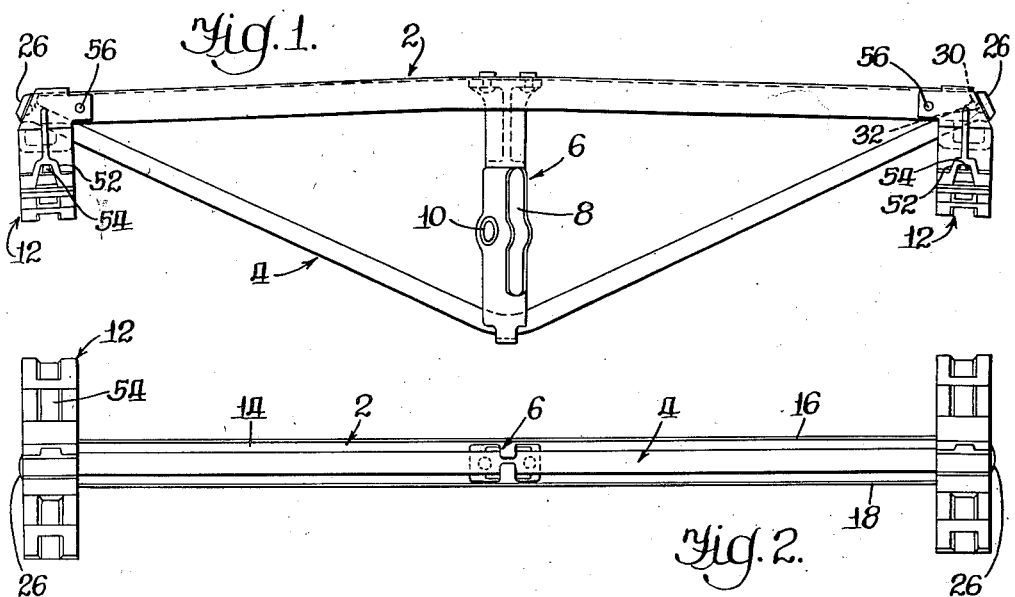
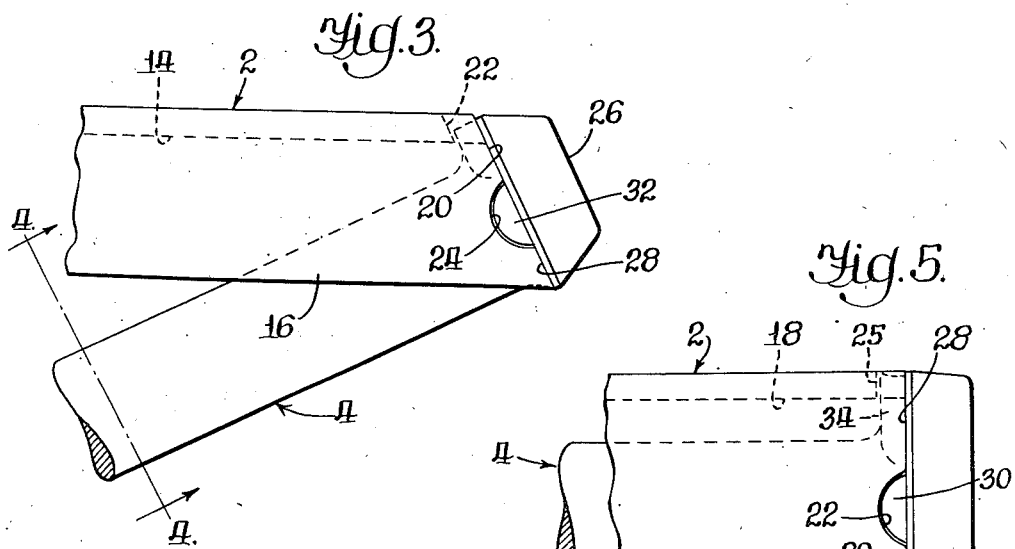
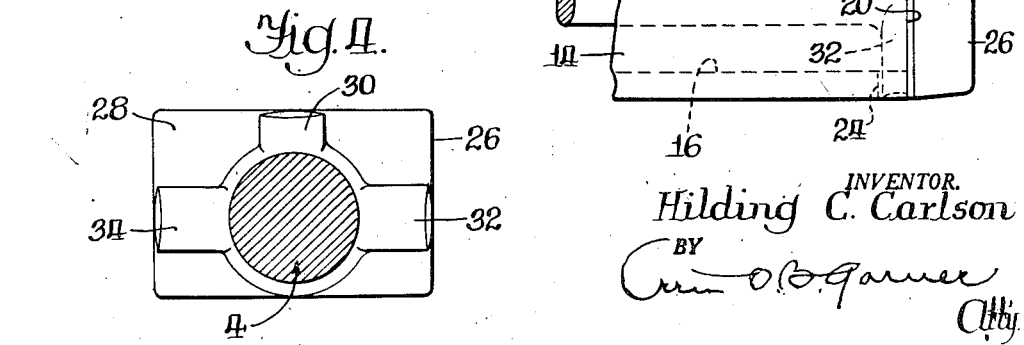
INVENTOR.
Hilding C. Carlson
BY

United States Patent Office 2,782,882
Patented Feb. 26, 1957

2,782,882
BRAKE BEAM

Hilding C. Carlson, Hammond, Ind., assignor to American Steel Foundries, Chicago, Ill., a corporation of New Jersey Application November 26, 1951, Serial No. 258,127

1 Claim. (Cl. 188—225.6)

This invention relates to railway truss type brake beams and more particularly to a beam having a novel, mechanical interlock between the truss parts.

Prior art beams of this type have generally been welded or the truss parts have been interconnected by unsatisfactory means such as threaded members which tend to loosen under the intense vibrations of railway service.

A primary object of the present invention is to devise an economical brake beam which can be quickly assembled and disassembled and which is capable of withstanding the rigors of railway service.

Another object of the invention is to devise a beam in which the truss parts are mechanically interlocked to facilitate assembly and disassembly of the beam during manufacture and repair thereof.

A further object of the invention is to provide a novel, mechanical interlock between the tension and compression members, by providing a plurality of lugs or projections at the ends of the tension member received within complementary notches or recesses of the compression member.

Still another object of the invention is to devise a brake beam, such as above described, wherein the ends of the compression member are seated against the tension member along complementary surfaces converging rearwardly from the ends of the beam to prevent undesirable stress concentration along the interlocking lugs and notches of the tension and compression members, respectively.

Yet another object of the invention is to devise a brake beam, such as above described, wherein the compression member may be formed of standard steel section and the tension member may be economically formed with upset end portions adapted for removable interlock with the ends of the compression member, as above described.

The foregoing and other objects and advantages of the invention will become apparent from a consideration of the specification and the accompanying drawings, wherein:

Figure 1 is a top plan view of a brake beam embodying a preferred form of the invention;

Figure 2 is a front elevational view of the beam shown in Figure 1;

Figure 3 is an enlarged fragmentary top plan view of one end of the brake beam truss with the brake head removed;

Figure 4 is a sectional view of the tension member taken on the line 4—4 of Figure 3, and Figure 5 is a rear elevational view of the structure shown in Figure 3.

Describing the invention in detail and referring first to Figures 1 and 2, it will be seen that the brake beam illustrated therein comprises a compression member 2 cambered in the usual manner and connected to a tension member 4 by a strut or fulcrum 6 having a lever slot 8 and a pin hole 10 intersecting said slot to accommodate pivotal mounting of an associated brake lever (not shown) therein.

The ends of the tension members 2 and 4 of the brake beam truss are interconnected as hereinafter described in detail and are provided with brake heads 12 adapted for connection in the usual manner to brake shoes (not shown).

Referring now to Figures 3 to 5, it will be seen that the compression member 2 is preferably formed of standard U-section steel stock and comprises a rear wall 14 as well as top and bottom webs 16 and 18 projecting forwardly therefrom.

The extremities of the wall 14 and the webs 16 and 18 at each end of the beam are provided with abutment surfaces 20 which are preferably coplanar and which are diagonal with respect to the longitudinal axis of the beam so that the surfaces 20 at one end of the beam converge rearwardly thereof with respect to the corresponding surfaces at the opposite end of the beam.

Each end of the compression member rear wall 14 is notched as at 22 and similarly the ends of the webs 16 and 18 are notched as at 24 and 25, respectively.

The tension member 4 at each end of the beam extends between the webs 16 and 18 and projects outboardly of the compression member 2. The outboard extremity of the tension member is provided with a head or cap 26, integrally formed thereon or removably attached thereto in any convenient manner.

The cap 26 is in complementary flat face engagement as at 28 with the related surface 20, and the inboard side of the cap surface 28 is formed with ribs or lugs 30, 32 and 34 complementary to and received within the compression member notches 22, 24 and 25, respectively. By means of this simple and ingenious arrangement, the truss parts of the beam are interlocked against any substantial movement relative to each other without the necessity of special interlocking parts on the brake heads 12 or on special locking elements such as heretofore used in the prior art.

It may be noted that the rearwardly converging relationship of the compression member surfaces 20 and the tension member surfaces 28, which seat against the surfaces 20, as above described, prevents the imposition of substantial stresses on the interlocking lugs 30, 32 and 34 and their related compression member notches.

Each brake head 12 comprises a conventional front wall 52 as best seen in Figures 1 and 2 and also comprises the usual keyway 54 (Figure 1) for connection in the usual manner to associated key means (not shown) for securing brake shoe means (not shown) against the forward surface of the front wall. The brake head is preferably removably attached to the truss as by rivets 56 extending through the compression member webs.

The novel brake beam is particularly adapted to facilitate assembly and disassembly of its component parts. After the caps 26 have been formed, as by upsetting the ends of the tension member 4, the tension member may be bent to V-shaped configuration in the assembled position illustrated in Figure 1 whereat the lugs 30, 32 and 34 are removably inserted into their related compression member notches, whereupon the strut 6 may be assembled with the tension and compression members, as shown in Figure 1. The brake heads 12 may be applied, as above described, either before or after assembly of the strut.

It may be further noted that the brake heads may be quickly removed for the purpose of repair or replacement by burning or severing the rivets 56 and then slipping the brake heads off the ends of the truss without disturbing the connection between the tension and compression members 2 and 4; and if desired, these members may be separated by bending the tension member 4 toward a straight line configuration thereof, until the lugs 30, 32 and 34 thereof are disengaged from the related compression member slots 22, 24 and 25, respectively, whereupon the entire beam may be disassembled. In this connection, it will be understood that the strut 6 is readily removable at any time to accommodate such bending of the tension member.

I claim:

A railway brake beam comprising a truss structure including a compression member, generally U-shaped in cross section, a substantially V-shaped tension member, and a separable strut connected therebetween, said compression member having a rear wall with top and bottom webs projecting forwardly therefrom, the ends of said wall and webs having notches therein, the notches in said webs being substantially normal to the notches in said wall, said wall and webs additionally presenting at the ends thereof rearwardly converging substantially flat surfaces, said tension member having opposite end locking portions presenting rearwardly converging substantially flat surfaces removably engaging respective surfaces of the compression member, the surfaces of each of said locking portions having three spaced lugs removably seated in the related notches of the compression member, the engagement between said lugs and notches being a separable interlocking engagement whereby upon detachment of said strut the tension member may be bent toward straight line configuration thereof to release said lugs from the related notches and said surfaces from interengagement to accommodate separation of the compression and tension members from each other by sliding said tension member forwardly away from said compression member.

References Cited in the file of this patent

UNITED STATES PATENTS

| | | |
|---|---|---|
| 766,362 | Lamont | Aug. 2, 1904 |
| 850,335 | Baker | Apr. 16, 1907 |
| 979,668 | Haskell | Dec. 27, 1910 |
| 989,780 | Haskell | Apr. 18, 1911 |
| 996,584 | Hoffman | June 27, 1911 |
| 1,161,329 | Peffers | Nov. 23, 1915 |
| 2,170,121 | Busch | Aug. 22, 1939 |